March 22, 1966   G. E. TERNENT   3,241,888
FLUID PRESSURE BRAKING SYSTEM
Filed Dec. 19, 1963   2 Sheets-Sheet 1
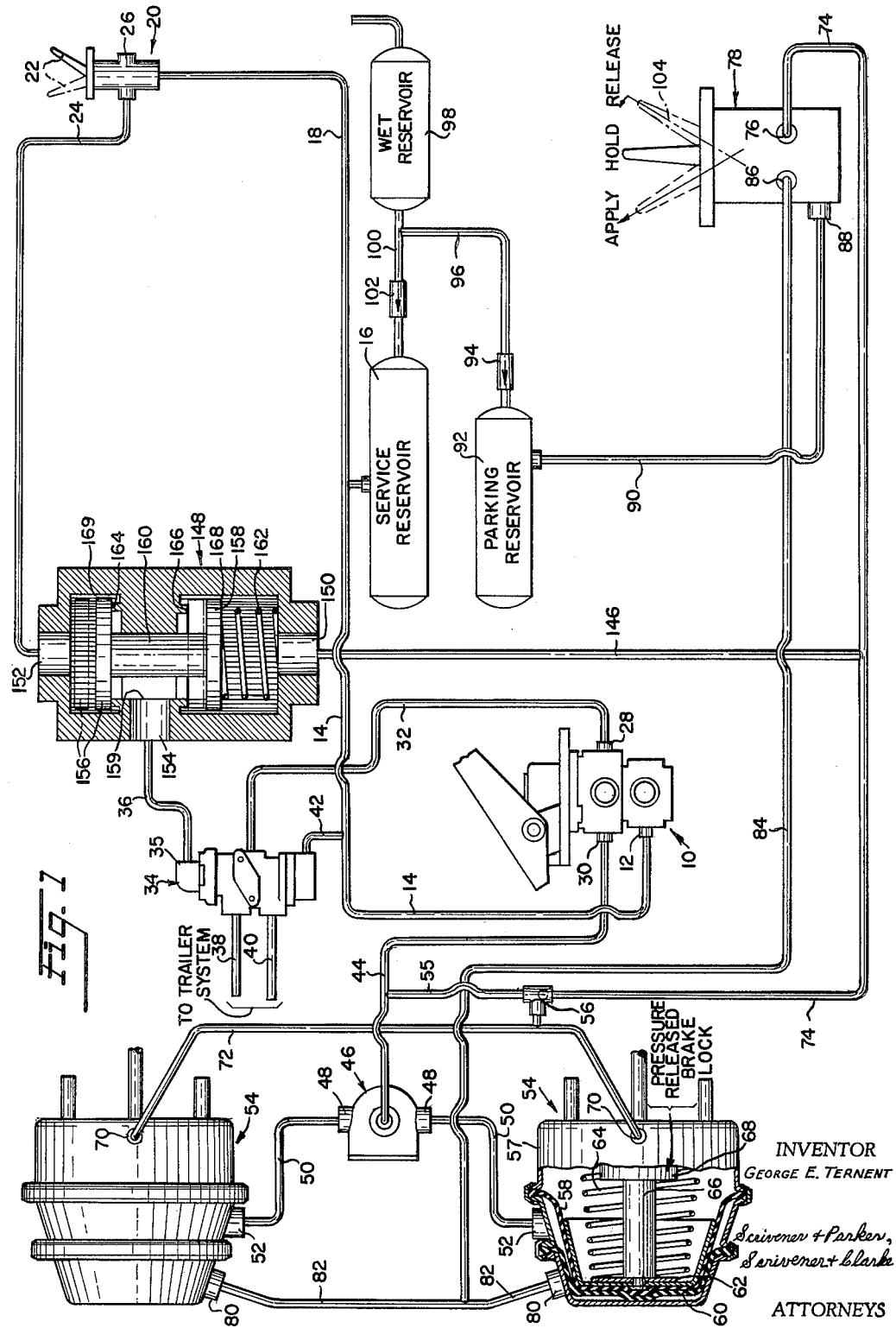
INVENTOR
GEORGE E. TERNENT
Scrivener + Parker,
Scrivener + Clarke
ATTORNEYS

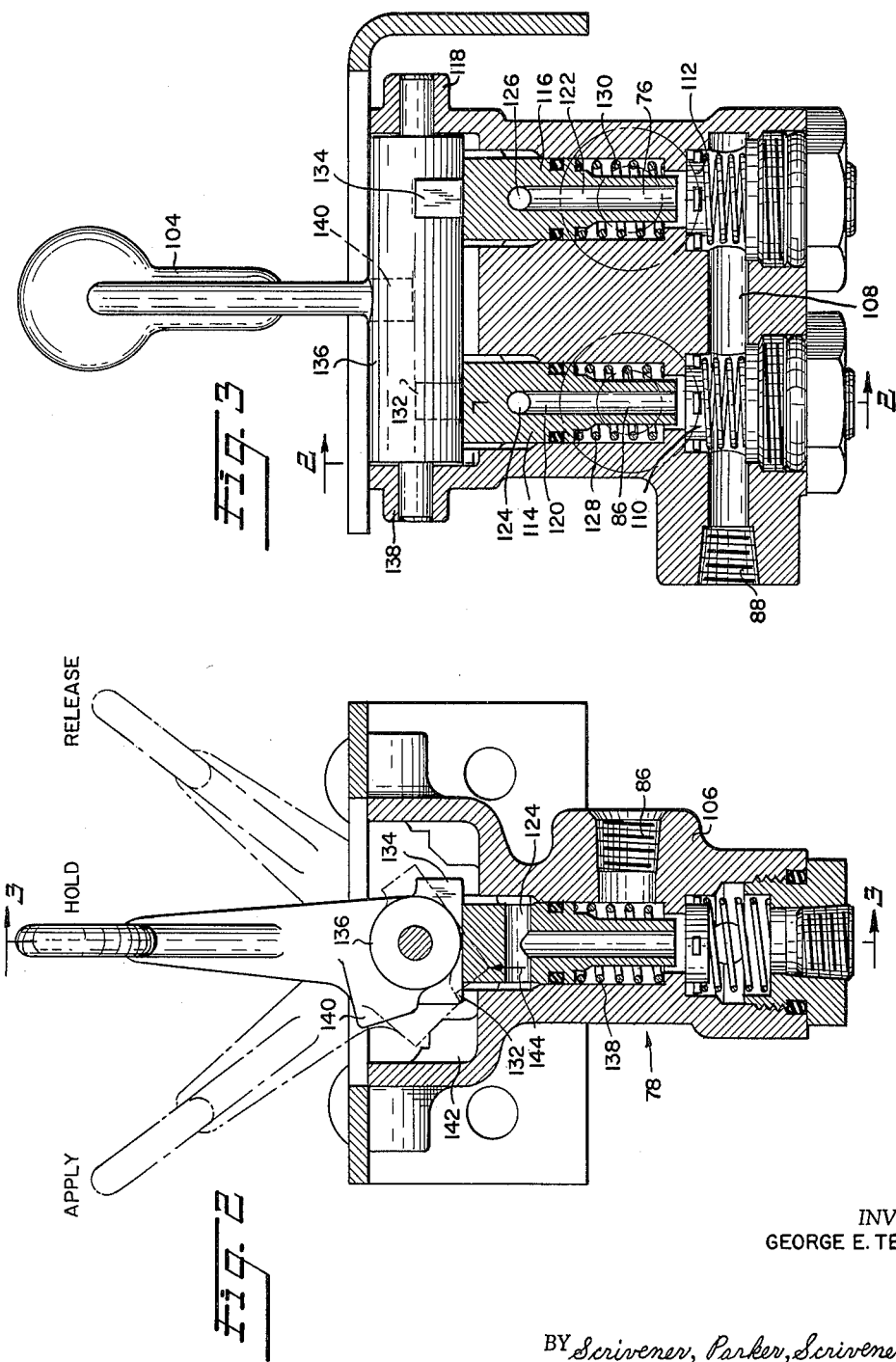

United States Patent Office 3,241,888
Patented Mar. 22, 1966

3,241,888
FLUID PRESSURE BRAKING SYSTEM
George E. Ternent, Elyria, Ohio, assignor to Bendix-Westinghouse Automotive Air Brake Company, Elyria, Ohio, a corporation of Delaware
Filed Dec. 19, 1963, Ser. No. 331,742
11 Claims. (Cl. 303—7)

This invention relates to fluid pressure braking systems for vehicles and more particularly to safety and parking brake mechanisms for such systems.

The present invention is particularly concerned with tractor-trailer combinations wherein the tractor is provided with parking and emergency brake mechanism which serves to lock the tractor brakes in applied position during parking and includes fluid pressure operated emergency brake applying means which can be utilized either for normal parking or to effect the emergency application of the brakes in the event of failure of the service system. A prior pending application of Frank R. Schubert Serial No. 263,330 filed March 6, 1963 and assigned to the same assignee as the present invention, describes in detail emergency and parking brake mechanism for which the present invention is especially adapted. Broadly, the brake mechanism there described comprises a double diaphragm actuator and a mechanical one-way lock which, during normal vehicle operation, is retained against spring force by fluid pressure in a non-locking position and the brakes are applied in the normal manner by application of fluid pressure under the control of the operator to the space in the actuator between the diaphragms whereby one of the diaphragms is operated in a brake applying direction to apply the brakes. At the same time, this pressure is exerted in the opposite direction against the second diaphragm in the actuator and this diaphragm performs no function during normal service operation of the brake. When the vehicle employing the mechanism of the present and the prior applications is to be parked a manual control valve is operated to release the pressure from the lock mechanism so that this moves under spring force to its locking position. At the same time, pressure is applied to the second or emergency diaphragm and this is moved against the first diaphragm and the brake push rod so that the latter is moved in a braking direction, the lock, through wedging action, preventing return of the brake push rod to its brake release position.

The mechanism outlined above and described in detail in the pending application is effective and practical in every respect and it is the broad object of the present invention to incorporate in a tractor braking system employing the described mechanism, means whereby upon application and release of the parking brakes on the tractor the fluid pressure operated brakes of the trailer attached to the tractor are simultaneously applied and released under the control of the same valve which controls the application and release of the parking brake mechanism.

Another object of the invention is to provide in a system of the foregoing nature a novel vent valve which enables the brakes on the trailer to be independently applied or released whenever the tractor brakes are released but positively prevents release of the trailer brakes when the tractor brakes are locked in applied position.

Still another object of the invention is to provide in a fluid pressure braking system employing spring applied, fluid pressure released locking means for locking the brakes in applied position, means whereby the locking means are positively released upon a service brake application of high magnitude and in excess of that required for normal parking.

FIG. 1 is a diagrammatic view partly in section of a tractor brake system embodying the principles of the present invention;

FIG. 2 is an enlarged cross-sectional view of a control valve constructed in accordance with the invention and taken substantially on the line 2—2 of FIG. 3; and FIG. 3 is a cross-sectional view taken substantially on the line 3—3 of FIG. 2.

Referring now to the drawings and particularly to FIG. 1 thereof the numeral 10 refers to a typical pedal operated brake valve having an inlet port 12 connected by a conduit 14 to a service fluid pressure reservoir 16 which is also connected by way of a conduit 18 to the inlet of a two-way valve member 20 having a handle 22 which in one position serves to operate the valve to connect the conduit 18 with an outlet conduit 24 and in the second position disconnects conduits 18 and 24 while connecting the latter to an exhaust port 26.

Referring back now to the brake valve 10, this is also provided with a pair of outlet ports 28, 30, the first of which is connected by way of a conduit 32 with the service port of a tractor protection valve, generally indicated by the numeral 34 and which may be of the type shown in Patent No. 2,850,330 to Andrews. The valve 34 is of a well-known type and includes at its upper end a control port 35 leading to a control chamber which receives pressure by way of a conduit 36 such that when pressure above a pre-determined level is admitted to the control port the valve is actuated to inter-connect the trailer service and emergency conduits, indicated by the numerals 38 and 40, with the corresponding conduits 32 and 42 on the opposite side of the valve as shown. It will be noted that the emergency conduit 42 is directly connected to the service reservoir 16 by way of the aforementioned conduit 14. When the pressure at the control port 35 of the valve 34 falls below a pre-determined safe level or is deliberately released, the valve 34 is actuated to close off the conduits 32 and 42, while simultaneously the trailer emergency and service conduits are connected to atmosphere so as to effect an emergency application of the trailer brakes in a manner well recognized by those skilled in the art.

Referring yet again to brake valve 10, the second outlet port 30 of the valve is connected by way of a conduit 44 to a conventional quick release valve generally indicated by the numeral 46. The valve 46 is provided with the usual outlet ports 48, each of which is connected by way of a conduit 50 to the service port 52 of the brake mechanism generally indicated by the numeral 54 and more particularly described in the aforementioned pending application, Serial No. 263,330, to which reference is made for a detailed description. The brake valve 10 is also connected by way of branch line 55 to one side of the double check valve 56, the purpose of which will be explained later.

As should be clear from FIG. 1, the service port 52 leads to space in the body 57 of the actuator between a first service diaphragm 58 and a second emergency diaphragm 60. A push plate 62 is urged by a spring 64 against an inner face of the diaphragm 58 and carried by the push plate 62 is a push rod 66 which extends through a brake lock mechanism generally indicated by the numeral 68 and which may be of the type described in the aforementioned application. A lock port 70 in the actuator body 57 leads to the lock mechanism and is connected by way of conduits 72 and 74 to one outlet port 76 of a control valve 78 hereinafter described in detail. For purposes of the present application it is sufficient to say that when pressure is admitted through the conduit 74 and 72 to the lock port 70 the lock mechanism 68 is suspended in non-locking position and when pressure is exhausted from the port 70 the lock is spring-urged to locking position and is arranged to permit the push rod 66 to move to the right in FIG. 1 while positively preventing its return. However, so long as pressure above a predetermined level exists at the lock port 70, when service pressure is admitted to the service inlet port 52 the service diaphragm 58 moves the push rod 66 to the right to effect a normal service application of the tractor brakes. In addition to the service inlet port the brake mechanism 54 is provided with an emergency port 80 which is connected by way of conduits 82 and 84 with a second outlet port 86 in the control valve 78. It will be apparent from an inspection of FIG. 1 that when pressure is admitted to the emergency port 80 the emergency diaphragm 60 is actuated to move the push rod 66 to the right to effect an emergency application of the tractor brakes.

Referring now to the control valve 78, this is provided with an inlet port 88 which is connected by way of a conduit 90 with an isolated, parking reservoir 92 which is supplied with fluid through a check valve 94 and a conduit 96 from a wet reservoir 98 which also serves to supply fluid through a conduit 100 and a check valve 102 to the aforementioned service reservoir 16. The valve 78 is of the three-way variety and is provided with a handle 104 which is movable between three positions of "Apply," "Hold," and "Release," as labeled in the drawings. When the handle 104 is in the phantom line "Release" position the inlet port 88 is connected to the outlet port 76 to admit fluid pressure to the lock port 70 by way of conduits 74 and 72 to move the lock to its release position. When the handle is moved to and held in the "Apply" position the inlet port 88 is connected to the outlet port 86 so that fluid flows by way of conduits 84, 82 to the emergency inlet port 80 of the actuator so as to operate the emergency diaphragm 60 to move the push rod in a brake applying direction. Because in the "Apply" position of the handle, the outlet port 76 of the valve 78 is connected to atmosphere, no pressure exists at the lock port 70 and after the brake has been moved to "Apply" position it is retained in this position by engagement of the lock with the push rod 66. Now when the handle 104 is released it automatically returns (as will appear hereinafter) to the intermediate solid line "Hold" position where the inlet port 88 is disconnected from the outlet port 82 and the latter is connected to atmosphere to release the air from the emergency diaphragm 60 so that the brakes are now locked in parked position with no air in the actuator. To prevent an inadvertent service brake application from becoming locked on the actuator in either the "Apply" or "Hold" position of the lever 104 the double check valve 56 is provided between the branch conduits 55 and the conduit 74 so that the lock port 70 by way of the conduit 72 can be charged to release the locks from either branch conduit.

The control valve 78 is shown in detail in FIGS. 2 and 3 and comprises a body 106 containing two identical side by side valve mechanisms which serve to control the flow of fluid between the inlet port 88 and the outlet ports 76, 86. As can be seen in FIG. 3, the inlet port 88 leads to a cross-passage 108 containing a pair of check valves 110, 112 which are normally urged by spring pressure to closed position. Spaced above the check valves are a pair of plungers 114, 116 containing central exhaust passages 120, 122 whose upper ends are at all times connected to atmosphere through the top of the valve body by way of cross passages and ports 124, 126 as clearly shown in the drawings. The plungers are normally urged to their raised position in the drawings by springs 128, 130 and are movable downwardly against the springs by means of cam parts 132, 134 integral with a barrel 136 rotatably supported at its opposite ends in suitable bearings 138 in the valve body, the handle 104 is integral with the barrel and extends upwardly therefrom symmetrically with respect to the cams 132, 134. It will be obvious in FIG. 2 that when the handle 104 is moved from the central "Hold" position to the "Release" position, the cam 134 will act on the right-hand plunger 116 to move this downwardly against the check valve 112 to first close off the exhaust passage 122 and thereafter open the check valve 112 to connect the inlet port 88 to the outlet port 76 so that fluid flows to the lock port 70 to move the lock to its non-locking position as previously explained.

When the handle 104 is moved to the "Apply" position the cam 132 operates on the plunger 114 to open the check valve 110 and admit fluid to the emergency port 8 to apply the brakes by the emergency diaphragm 60 as described, and it will be apparent from FIG. 2 when the handle is either in the "Apply" or "Release" position only one of the cams serves to operate its valve while the other remains idle so that when one valve is open the outlet port leading to the other valve is connected to atmosphere. Obviously when the handle is in "Hold" position both check valves are closed as in FIG. 3 and both outlet ports are connected to atmosphere.

In accordance with the invention, it is desirable that the handle not remain in the "Apply" position after the brakes have been applied and locked in this position. That is to say, after the vehicle has been parked as soon as the operator releases the handle it should return automatically to "Hold" position in order that the operator may be informed as to whether or not the brakes are locked-on before leaving the vehicle. This is achieved in the present invention by providing the barrel 136 on one side with an integral lobe or stop member 140 which is adapted to engage a fixed abutment 142 at a point wherein the cam 132 is prevented from moving past dead center below the axis of the barrel 136 whereby the upward force of the spring 138 on the plunger 114 is exerted to the left of the axis as indicated by the arrow 144 so that as soon as the operator releases the handle it is immediately and automatically snapped back to the "Hold" position of FIG. 2.

On the other hand, when the handle is moved to the "Release" position it is necessary that it remain in this position in order that the check valve 112 be retained open so that fluid pressure exists at the lock port 70 during normal brake operation to retain the lock in its non-locking position. This is achieved by eliminating any stop means on the opposite side of the barrel whereby the cam 134 may move past dead center to the approximate position of the arrow 144 on the left of the axis of the barrel whereby the upward force of the spring 130 acting on plunger 116 tends to move the handle 104 in a clockwise direction in FIG. 2 and the handle is thus retained in the "Release" position.

In accordance with the invention where the described brake mechanism is employed with a tractor-trailer combination it is desirable that when the brakes of the tractor are parked the fluid pressure actuated brakes on the trailer be also applied. This is accomplished in the system of the invention by the provision of a conduit 146 which is connected at one end to the lock port conduit 74 and at the other is connected to the control conduit 36 of the tractor protection valve through an improved vent valve generally indicated by the numeral 148. The valve 148 is provided with a pair of opposed inlet ports 150, 152 respectively connected to the conduit 146 and to conduit 24 leading to the outlet of the previously described manual control valve 20. The valve 148 has an outlet 154 leading to the control conduit 36 and contained within the body of the valve 148 are a pair of check valve elements 156, 158 which are rigidly inter-connected through an enlarged central bore 159 by a central plunger 160. A light spring 162 normally urges the valve elements to the phantom line position wherein the upper valve 156 is moved clear of its seat 164 and the lower valve 158 is in engagement with its seat 166.

It will be observed in FIG. 1 that the outer annular edges of the valve elements extend radially beyond the valve seats 164, 166 and the extending parts engage suitable splines or grooves as shown at 168, 169 so as to afford choke passages from one side of a valve element to the other when the element is in its open position. The purpose of the choked passages, for example the passages 169 of the upper element 156, is to retard the passage of air past the element so that when the handle 22 of the two-way valve 20 is in a position inter-connecting the conduits 18, 24 and the trailer is parked, i.e., there is no pressure in the conduit 146, the fluid flows rapidly on to the upper surface of the element 156 so that both of the elements are moved rapidly downwardly until the upper element 156 engages seat 164 whereby no control pressure is admitted to valve 34 and the trailer brakes remain applied.

Assuming that the valve elements 156, 158 have been moved to the solid line position of the drawing following venting of conduit 146, when the handle 104 of the valve 78 is moved to the "Release" position the lock port 70 is pressurized to release the tractor brakes and at the same time fluid under pressure flows through conduit 146 and is received on the lower surface of the valve element 158. The choked passages 168 on the side of element 158 cause a buildup of pressure on the lower side of element 158 which, aided by the force of spring 162, is sufficient to move element 158 to its closed position and at the same time, the upper element 156 is opened to admit control pressure by way of two-way control valve 20 and conduit 24 to the control chamber of tractor protection valve 34 thus restoring the tractor-trailer braking systems to a fully operative condition. It will be observed that so long as conduit 146 is charged and the tractor brakes thus released, the trailer brakes can be controlled independently of the tractor brakes by operation of the handle 22 of the two-way control valve 20. That is to say, when the handle 22 is moved to the left the control port 35 of valve 34 is exhausted and the trailer brakes are automatically applied. Obviously, when the handle 22 is in the right-hand position of FIG. 1 and system pressure is at a predetermined minimum level control pressure operates on valve 34 through vent valve 148 to inter-connect the braking systems.

When the attached vehicles are to be parked, after the vehicles have come to a full stop in the parking location, the operator moves the handle 104 of the valve 78 from the "Release" to either the "Hold" or "Apply" position. If his foot is still on the brake pedal when he has fully stopped, the tractor service brakes are already applied so the operator would then only move the handle to the "Hold" position whereupon the locks are released through the double check valve 56 and the brake valve when the operator takes his foot off the brake pedal, and the tractor service brakes are locked in the applied or parked position. At the moment that the handle 104 is moved to the "Hold" position, the conduit 146 leading to vent valve 148 is exhausted and as soon as this occurs, assuming that pressure exists at inlet port 152 of valve 148, the valve 156 is moved with a snap action to the solid line position to insure that the control chamber of valve 34 is exhausted in a reverse direction through the grooves 168 in the lower element 158 of valve 148 so that the trailer brakes remain applied. Though the valve elements 156, 158 will move to the upper phantom line position when the conduit 24 is connected to atmosphere through valve 20, as soon as valve 20 is again operated to supply fluid to conduit 24 the valve element 156 will again be moved to the solid line position of the drawing and the trailer brakes will remain applied. In short, whenever the tractor brakes are locked in applied position in accordance with the invention, it is impossible to release the trailer brakes by operation of controls readily available to the vehicle operator. However, as previously mentioned, whenever the tractor brakes are released and pressure exists in conduit 146 so that the valve elements 156, 158 are in their raised position, the trailer brakes may be applied and released in a normal manner independently of the tractor brakes by operation of the two-way valve 20.

It will be understood that when the handle 104 of valve 78 is moved to the "Apply" position, so far as the vent valve 148 is concerned the operation thereof is the same as previously described.

In view of the foregoing description it is not believed that any further description of the operation of the invention is required. It will, of course, be appreciated by those skilled in the art that the invention is susceptible to changes and modifications without departing from the scope and spirit of the appended claims.

What is claimed is:

1. Safety brake mechanism for a tractor-trailer braking system including first and second sources of fluid pressure carried on the tractor, said sources being isolated from each other, a trailer emergency conduit connected to said first source and a fluid pressure responsive tractor protection valve including a control port, said valve being disposed in said emergency conduit to disrupt or establish communication between said source and said conduit or between said conduit and atmosphere depending on whether the pressure at said control port is above or below predetermined levels, in combination therewith, a brake actuator on the tractor, a spring applied brake locking means for locking the actuator in brake applied position, fluid pressure actuated release means for releasing said brake locking means, a manually operable control valve having an inlet port connected to said second source of fluid pressure, an outlet port connected to the brake lock release means, and an atmospheric port, said valve being movable between a first position communicating said inlet and outlet ports while disrupting communication between the latter and said exhaust port and a second position disrupting communication between said inlet and outlet ports while communicating the latter with said exhaust port, a control conduit communicating the control port of said tractor protection valve with said first source of fluid pressure, a second fluid pressure responsive valve means including vent passage means and an inlet port connected to the outlet port of said manual control valve, said second valve being disposed in said control conduit and disrupting or establishing communication between said first source and said control port or between said control port and said vent passage means depending upon whether pressure is admitted to or exhausted from the brake lock release means and consequently to or from said inlet port of said second valve by operation of said manual control valve.

2. The safety brake mechanism of claim 1 wherein said second fluid pressure responsive valve means includes a check valve for positively preventing the flow of fluid pressure from said first source to said control port and includes a fluid pressure responsive element responsive to a pre-determined pressure at said inlet port of said second valve means for moving and retaining said check valve in open position so long as pressure is admitted to the inlet port of said valve, said second valve means including a second valve element for closing off said vent passage means when said check valve is moved to open position.

3. The safety brake mechanism of claim 2 wherein said fluid pressure responsive element is also responsive to pressure at said control port to move said second valve element to open said vent passage means upon movement of said check valve to closed position in response to exhaustion of pressure from said inlet port of said second valve means and said brake lock release means.

4. In combination with a tractor-trailer fluid pressure braking system including first and second sources of fluid pressure, tractor and trailer emergency and service conduits, a tractor protection valve inter-connecting said tractor emergency and service conduits with the corresponding trailer conduits and including a control port, said valve being operable to establish or disrupt communication between said tractor and trailer emergency conduits depending upon whether the pressure at said control port is above or below a predetermined level, said protection valve connecting at least said trailer emergency conduit to atmosphere to effect application of the trailer braking system when pressure at said control port is below a predetermined level, a fluid pressure actuator on the tractor for applying the tractor brakes, spring applied brake locking means for locking said actuator in brake applied position, fluid pressure operated release means for releasing said brake locking means, a manual control valve having inlet, outlet and exhaust ports and movable between a first position connecting said inlet and outlet ports while disconnecting the latter from the said exhaust port and a second position disconnecting said inlet and outlet ports while connecting the latter to said exhaust port, a conduit connecting said inlet port to said second source of fluid pressure, a second conduit connecting said outlet port to said brake lock releasing means, vent valve means having an outlet port and first and second opposed inlet ports, a fluid conduit connecting said outlet port to the control port of said tractor protection valve, a second conduit connecting the first inlet port to said first source of fluid pressure, and a third conduit connecting the second inlet port to the conduit inter-connecting the outlet port of the manual control valve with said brake lock release means, first and second inter-connected opposed check valves in said vent valve means movable in unison between first and second positions establishing communication between the first inlet port and said outlet port while disrupting communication between the second inlet port and said outlet port and vice versa, spring means urging said check valves to a position wherein the first inlet port is communicated with said outlet port and the latter is disconnected from the second inlet port, said check valves being moved in response to the presence of pressure from said first source at said first inlet port and the release of pressure from said second inlet port to disrupt communication between said first source and said control port while connecting the latter to the second inlet port whereby fluid is released from said control port to effect application of the trailer braking system so long as the tractor brakes are locked in applied position in response to release of pressure from said lock release means by actuation of said manually movable valve to its lock releasing position.

5. Safety brake mechanism for tractor-trailer fluid pressure braking systems of the type including a source of fluid pressure, spring applied, pressure released brake locking means on the tractor, a tractor protection valve including a control port inter-connecting the tractor and trailer braking systems, and a manual control valve having an outlet port connected to said pressure release brake locking means for alternatively applying or releasing fluid pressure from the brake locking means, means for positively insuring application of the trailer brakes when fluid pressure is released from the tractor brake locking means comprising a vent valve having an outlet port connected to the control port of the tractor protection valve, a first inlet port connected to the outlet port of the manual control valve, and a second inlet port connected to the source of fluid pressure, a check valve in said vent valve for preventing the passage of fluid from said first inlet port to said outlet port, vent passage means in said vent valve normally communicating said outlet and control ports with atmosphere, a second valve in said vent valve for controlling said vent passage means, fluid pressure responsive means in said vent valve exposed at all times through said second inlet port with the pressure existing in the tractor brake lock release means, said pressure responsive means being moved in response to releasing pressure delivered to said lock release means to operate said second valve in said vent valve to close said vent passage means and open said check valve and being responsive to the release of pressure from said brake lock means to operate said second valve and communicate said vent passage means with said control port while simultaneously affecting closing of said check valve.

6. In a tractor-trailer fluid pressure braking system including first and second sources of fluid pressure on the tractor, a tractor and trailer emergency conduit connected to the first source of fluid pressure, a tractor protection valve, including a control port, in said tractor and trailer emergency conduit, fluid pressure brake actuator means on the tractor, and spring applied, fluid pressure released brake locking means for locking the actuator means in brake applied condition, a manual control valve between said second source and said brake locking means and operable to alternatively connect said brake locking means to said second source of fluid pressure or to atmosphere, a second valve between said first source of fluid pressure and the control port of said tractor protection valve and normally disconnecting said first source and said control port while connecting the latter to atmosphere, and a fluid pressure responsive element communicating with said brake locking means and solely responsive to the admission of pressure to said brake locking means for operating said second valve to disconnect said control port from atmosphere while connecting the latter to said first source of fluid pressure simultaneously with the presusre release of said brake locking means.

7. In a tractor-trailer fluid pressure braking system including first and second sources of fluid pressure on the tractor, tractor and trailer emergency conduits connected to the first source of fluid pressure, a tractor protection valve, including a control port, interconnecting said tractor and trailer emergency conduits, fluid pressure brake actuator means on the tractor, and spring applied, fluid pressure released brake locking means for locking the actuator means in brake applied condition, a manual control valve between said second source and said brake locking means and operable to alternatively connect said brake locking means to said second source of fluid pressure or to atmosphere, a second valve between said first source of fluid pressure and the control port of said tractor protection valve and including a valve body having an inlet port connected to the first source of fluid pressure, an outlet port connected to the control port of the tractor protection valve and an exhaust port, inlet and exhaust valve means in said valve body normally disrupting communication between said inlet and outlet ports while communicating the latter with said exhaust port, and fluid pressure responsive means exposed at all times to the pressure in said brake locking means and operatively connected to said inlet and exhaust valve means for actuating the same to communicate said inlet and outlet ports with each other while disrupting communication between the latter and said exhaust port whenever unlocking pressure is admitted to said brake locking means.

8. In a tractor-trailer fluid pressure system including a source of service fluid pressure on the tractor, an isolated source of parking fluid pressure on the tractor, brake actuator means on the tractor, tractor and trailer emergency and service conduits connected to the service source of fluid pressure, a tractor protection valve including a control port inter-connecting the tractor and trailer conduits, and a spring applied, fluid pressure released brake locking means for locking the actuator means in brake applied condition, means including a manual control valve inter-connecting said parking source of fluid pressure and said brake locking means, said valve being operable to alternatively connect said brake locking means to said source of parking pressure or to atmosphere, a second valve between said service source of fluid pressure and the control port of said tractor protection valve and normally occupying a first position disconnecting said service source and said control port while connecting the latter to atmosphere but being movable to a second position connecting said service source and said control port while disconnecting the latter from said exhaust port, a fluid pressure responsive element operatively connected to said second valve, and fluid conduit means connecting said fluid pressure responsive element to the brake locking means to actuate said pressure responsive element and move said second valve to its second position when pressure from said parking source is admitted to said brake locking means to release the same.

9. In combination with interconnected tractor and trailer braking systems including a service source of fluid pressure carried on the tractor and communicating at all times with the tractor braking system, an isolated parking source of fluid pressure carried on the tractor, valve means for controlling the flow of fluid pressure from said tractor system to said trailer system and including normally closed check valve means preventing the flow of fluid pressure from said tractor system to said trailer system, a fluid pressure responsive element for effecting movement of said check valve means to open position, and means including a manually operable valve connecting said fluid pressure responsive element to said parking source of fluid pressure, said manually operable valve being movable from a first position wherein said parking source is disconnected from said pressure responsive element and the latter is connected to atmosphere to a second position wherein said parking source is connected to said pressure responsive element and the latter is disconnected from atmosphere.

10. The combination of claim 9 including fluid pressure operated brake actuator means on the tractor, spring applied pressure released brake locking means for locking said actuator means in brake applied condition, and fluid conduit means communicating said brake locking means with said fluid pressure responsive element and said manually operable valve whereby fluid pressure from the parking source is simultaneously admitted to and exhausted from said brake locking means and said fluid pressure responsive element by actuation of said manually operable valve.

11. In combination with interconnected tractor and trailer braking systems including fluid pressure operated brake actuators, a service source of fluid pressure and an isolated parking source of fluid pressure carried on the tractor, spring applied, fluid pressure released brake locking means for locking the tractor actuators in brake applied position, normally closed check valve means preventing the flow of fluid pressure from said service source to said trailer system, a fluid pressure responsive element for effecting movement of said check valve means to open position, and means including a manually operable valve connecting said brake locking means and said fluid pressure responsive element to said parking source of fluid pressure, said manually operable valve being movable from a first position wherein said parking source of fluid pressure is disconnected from said brake locking means and said pressure responsive element and the latter are connected to atmosphere to a second position wherein said parking source is connected to said pressure responsive element and to said brake locking means and the latter are disconnected from atmosphere.

References Cited by the Examiner
UNITED STATES PATENTS 3,095,244    6/1963    Valentine et al. _____ 303—9

BENJAMIN HERSH, *Primary Examiner.*

EUGENE G. BOTZ, *Examiner.*